United States Patent [19]

Kaplan

[11] 4,129,543

[45] Dec. 12, 1978

[54] THERMOSETTING MOLDING RESIN COMPOSITIONS

[75] Inventor: Neil Kaplan, Brooklyn, N.Y.

[73] Assignee: Hi-Tech Industries, Inc., Jamaica, N.Y.

[21] Appl. No.: 697,307

[22] Filed: Jun. 18, 1976

[51] Int. Cl.$^2$ .............................................. C08K 5/54
[52] U.S. Cl. ...................... 260/29.15 B; 260/30.6 R; 260/32.6 R; 260/824 R; 260/864; 260/865
[58] Field of Search .................... 260/29.15 B, 32.6 R, 260/824 R, 30.6 R, 864, 865, 824

[56] References Cited

U.S. PATENT DOCUMENTS

| 2,523,065 | 9/1950 | Sage | 260/29.15 B X |
|---|---|---|---|
| 2,643,240 | 6/1953 | Walton et al. | 260/29.15 B X |
| 2,884,388 | 4/1959 | Hedlund | 260/824 R X |
| 3,909,484 | 9/1975 | Beavon | 260/865 |
| 3,959,203 | 5/1976 | Keil | 260/29.15 B |

OTHER PUBLICATIONS

Bjorksten, *Polyesters and their Applications*, (1965), p. 114.

*Primary Examiner*—Sandra M. Person
*Attorney, Agent, or Firm*—Howard C. Miskin

[57] ABSTRACT

This invention provides, in a first aspect, means for obtaining a liquid thermosetting polyester resin composition which is degassed without the loss of volatile component, by the presence of a dimethyl polysiloxane ingredient in the resin composition. The second aspect of the invention provides for mold lubrication and parting without substantial surface problems in the finished product by the presence of a mixture of an alkyl phosphate ester parting agent in combination with an alkylene bis-alkamide material.

17 Claims, No Drawings

THERMOSETTING MOLDING RESIN COMPOSITIONS

This invention relates to improved liquid thermosetting polyester resin compositions and, particularly, those liquid resin compositions especially suitable for injection molding.

Various processes have been specifically designed for injection molding of thermosetting resins, which are liquid at room temperature. For example, U.S. Pat. No. 3,608,150, describes one such procedure. In order to obtain a desirable high quality molded product, when carrying out such procedures, it has been found necessary to eliminate the dissolved gases prior to the injection molding. This had previously been done by extracting these gases by preliminarily heating the liquid resins, generally to a temperature below the thermosetting temperature, and/or applying vacuum draw to remove the dissolved gases. Such treatments, however, oftimes resulted in the loss of relatively expensive volataile liquid monomer from the mixture, and which necessitated either the addition of further volatile matter, which could in turn result in the redissolution of incondensible gases, such as air, or alternatively required the presence of an excess of such monomers in the original mixture to compensate for any loss during the degassing. Although the gas could be substantially completely removed by such methods, the loss of the monomer resulted in an undesirable expense to the system, and further presented a difficult problem of calculation, as it could not always be definitely ascertained exactly how much cross-linking monomer, for example styrene, had been lost.

Another problem afflicting such resins during the molding procedure, is the problem of "parting", or mold-release. A variety of agents have been suggested for the molding or casting of various polyester resins. Such materials have included the alkyl phosphate esters, for example as described in U.S. Pat. Nos. 3,772,241 and 3,810,863. Also see U.S. Pat. No. 3,825,517. Other mold-release agents have also been utilized for the molding of various thermoplastic polyester resin materials, for example monomeric organo-silicon compounds, are suggested in U.S. Pat. No. 3,652,484. These monomeric silicon compounds contain a variety of different organic groups, including both hydrocarbyl and hydrocarbyl ether groups. Another type of organo-silicon compounds, the organo-polysiloxanes, or silicones, and specifically dimethyl polysiloxane, has been generally described as useful for "mold release agents in rubber and plastics". It was recognized, however, that such silicone materials could cause severe difficulties in the surface finishing of the molded products, and therefore, it was found necessary to develop silicones which were compatible with coating materials. Dimethyl silicone fluids of various types are also utilized, in addition to mold release, as antifoams, automotive and furniture polish additives, cosmetics, fiber lubes in textiles and for other purposes. (See "Modern Plastics Encyclopedia," 74, 75, Vol. 51, October 1974, page 113).

Accordingly, it would be desirable to provide a liquid, thermosetting polyester resin composition, suitable for injection molding, which would be in the degassed condition without the requirement of heating and/or subjecting to vacuum or suction, and thus, loss of volatile monomer, and to provide a composition which has desirable parting properties, but which also is capable, in the finished molded condition, of being finished with a surface coating.

It has now been found that these desirable objects can be obtained, individually or in combination, by the present invention. Means are provided to degas the polyester resin prior to injection molding without loss of desirable volatile liquid materials in the resin mixture and further to provide, alone or in combination, effective parting, or mold lubricating, action without undesirable surface effects.

In accordance with the first aspect of the present invention, there is provided a liquid, thermosetting resin composition comprising an $\alpha$, $\beta$-ethylenically unsaturated polymerizable polyester, a vinyl monomer copolymerizable with the unsaturated polyester, the resin composition being liquid at room temperature, and a dimethyl polysiloxane, and which retains substantially no dispersed incondensible gas, such as air. The second aspect of the present invention provides a liquid, thermosetting resin composition comprising an $\alpha$, $\beta$-ethylenically unsaturated polymerizable polyester, and a vinyl monomer copolymerizable with the polyester, the resin composition being liquid at room temperature, and further containing, as a parting agent, the combination of an alkyl phosphate ester with an alkylene bis alkamide.

The surprising advantages obtained by the use of dimethyl polysiloxane, in accordance with the first aspect of the present invention, is not one which would have been expected by the prior art. There was no suggestion that this material would have this peculiar effectiveness for liquid thermosetting polyester resin compositions. It has been found that the degassing property of the dimethyl polysiloxane is especially pronounced in those materials which have a viscosity of greater than about 100 centistokes, as measured at 25° C., by determining the viscosity, in centipoises, with a Brookfield viscometer, RV series, at 25° C, and converting that value in accordance with the formula: viscosity(centistokes) = viscosity(centiposes)/density, preferably, up to about 60,000 centistokes.

The viscosity of the dimethyl polysiloxane materials useful in the present invention is limited only by the requirement that they are uniformly and finely dispersible throughout the resin composition. Accordingly, on a practical basis, a polysiloxane material having a viscosity greater than about 60,000 cs. at 25° C. has been found not to be generally useful when working with the usual mixing apparatus, suitable for the mixing of polyester resin compositions without undue increase in the temperature. However, high viscosity oils or even finely divided solids can be used if non-conventional and more effective dispersion equipment is available.

In a most preferred embodiment of this first aspect, the dimethyl polysiloxane which is utilized has a viscosity at 25° centigrade of at least about 500 centistokes, optimally up to about 5000 centistokes. The type of dimethyl polysiloxane which combines both the preferred degassing quality and which also is in the viscosity range rendering it most readily dispersible in the most generally available thermosettable polyester resin has a viscosity in the range of from about 500 to about 1,000 centistokes. Preferably, the dimethyl polysiloxane is added to the resin in an amount of from about 0.02 cc to about 3 cc per 100 grams of the thermosettable resin composition. Most preferably, the resin composition comprises at least about 0.5 cc. The term "100 grams of the thermosettable resin composition" refers to the unsaturated polyester and monomer only, as used in this specification.

In accordance with the second aspect of this invention, the resin composition is provided with a parting agent combination comprising the combination of an alkyl phosphate ester and an alkylene bis-alkamide. Preferably, the phosphate ester has the following empirical formula:

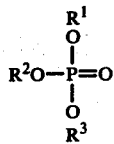

wherein $R^1$, $R^2$ and $R^3$ are selected from the group consisting of hydrogen atoms and alkyl groups, at least one R group is an alkyl group, and preferably one of $R^1$, $R^2$ and $R^3$ is a hydrogen atom. Each alkyl R group preferably contains at least about two carbon atoms, up to about 32 carbon atoms, and optimally contains from about 6 to about 24 carbon atoms each. The alkyl groups can be linear or have branched chains, but linear groups are preferred. Examples of such alkyl groups include decyl, dodecyl, stearyl, lauryl, n-hexyl, n-butyl, isooctyl, 2-ethylhexyl, isodecyl, n-decyl, n-dodecyl and n-octyl.

The alkylene bis alkamide is preferably a waxy solid material, and has the generic formula:

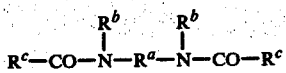

wherein the alklyene $R^a$ group contains from about 1 to about 8 carbon atoms, and optimally from about 2 to about 5 carbon atoms. Each of the groups $R^b$ can be an alkyl group and each of the groups $R^c$ can be a hydrogen atom or an alkyl group, preferably a hydrogen atom. The alkyl groups each contain at least about 6 carbon atoms, up to about 32 carbon atoms, and optimally in the range of from about 8 to about 24 carbon atoms.

The alkylene and alkyl groups on both the alkylene bis alkamide and on the alkyl phosphate ester can contain inert substituent groups, such as especially the halogens, e.g., chlorine and bromine, if the inert groups do not substantially interfere with the properties as regards the effect on the polyester resin compositions, in accordance with the present invention.

Examples of a suitable alkyl phosphate ester include: dioctyl phosphate, di(decyl) phosphate, dihexyl phosphate, trioctylphosphate, triethylphosphate, tri-n-hexyl phosphate, bis(2-ethylhexyl) phosphate, tris(2-ethylhexyl) phosphate, di(dodecyl) phosphate, mono-(decyl) phosphate and mono(dodecyl) phosphate.

Examples of preferred alkylene bis-alkamides include: ethylene bis(stearamide), ethylene bis(lauramide), propylene bis(stearamide), methylene bis(stearamide), propylene bis-(lauramide).

The parting agent combination of the alkyl phosphate esters and the alkylene bis alkamide results in an unexpected improvement. The alkyl phosphate esters are known as lubricants and mold-release agents suitable for thermosettable polyester resins. However, a problem that has continuously plagued the industry when utilizing these materials is the migration of the alkyl phosphate esters to the surface of the finished molded product in the form of spew. This tends to degrade the surface appearance, and further interferes with the application of finishing coats, such as paints, to the surface of the molded material. It has been found that when the alkyl phosphate ester is present in sufficient quantities to act as a mold-release agent, it also tends to affect the surface appearance. The present invention, however, surprisingly reduces the effect of spew, and substantially eliminates it, by the combination with the mold-release agent of a material, which in itself, at least in the quantities utilized, has substantially no effect on the mold-release of the material, but in combination with the alkyl phosphate ester, permits the substantial reduction in the quantity of phosphate that is utilized, so as to reduce or eliminate the problem of spew. Accordingly, in accordance with the present invention, the alkyl phosphate esters are present in an amount of about 0.1 to about 0.4 grams per 100 grams of thermosettable polyester resin composition, together with about 0.09 to about 0.3 grams of the alkylene bis alkamide. It has been further found, surprisingly, that the presence of the dimethyl polysiloxane degassing agent, together with the parting agent combination, results in a further improvement in the parting agent's effectiveness, again without the problem of spew arising. This is doubly surprising in view of the fact that most of the dimethyl polysiloxanes, which are utilized as degassing agents, would normally result in spew when present in sufficient quantity to act as a parting agent.

It has been found that exceeding the aforedescribed quantities of the alkylene bis alkamide, in no way mars the properties of polyester resin composition, but is merely wasteful. However, exceeding, by substantial quantities, the proportions of the alkyl phosphate ester set forth above, could result in the spewing or surface degrading problem, which this invention is intended to avoid. The present invention encompasses the use, not only of individual alkyl phosphate esters, and/or alkylene bis alkamide wax materials, but also mixtures of the same.

Any substantial excess of the dimethyl polysiloxane, can result in a charred surface effect in the finished molded product.

Accordingly, the maximum amount of any particular dimethyl polysiloxane which should be utilized is limited only by this surface effect. The excessive amount of the dimethyl polysiloxane has only a slight, if any, effect on the degassing efficiency, and even if charring does not occur, would at least be wasteful.

The two aspects of the present invention are both generally useful for the full range of presently available thermosetting unsaturated polyesters, and as anticipated, would also be useful for any of the same type of resin composition subsequently developed or made available on the market. The methods of preparing this class of unsaturated thermosettable polyesters are well-known and need not be discussed in great detail herein. Such polyesters can be prepared, for example, by condensing an α, β-ethylenically unsaturated dicarboxylic acid or anhydride, or mixtures thereof, with a dihydric alcohol, or mixtures of dihydric alcohols. The term dicarboxylic acid, when used henceforth, is intended to include not only the dicarboxylic acids, but the anhydrides which are, or can be, formed from such acids. Preferred examples of unsaturated dicarboxylic acids, which have been used, include maleic and fumaric acids; however, citraconic, chloromaleic, and the like, acid can also be used if desired. The degree of unsaturation in any particular thermosettable polyester, can be varied if desired, by the replacement of, generally at most, a minor proportion of the unsaturated acid, usually not more than about 25 mol percent, by saturated dicarboxylic acids, for example orthophthalic, isophthalic, terephthalic, succinic, adipic, sebacic and methylsuccinic acids, and the like. The maximum degree of cross-linking obtainable, is, of course, limited by the amount of unsaturation present in the linear polyester formed by the reaction of the dicarboxylic acid and the dihydric alcohol. Examples of other saturated and unsaturated dicarboxylic acids and anhydrides that can be utilized, include itaconic, mesaconic, pimelic, suberic and azelaic acids.

Dihydric alcohols that have been utilized in the preparation of the unsaturated thermosettable polyester resins, useful in the resin compositions of the present invention, include ethylene glycol, propylene glycol, butylene glycol, diethylene glycol, dipropylene glycol, triethylene glycol and isopropylidene bis-(p-phenyleneoxypropanol-2), cyclohexane dimethanol, neopentyl glycol and cyclobutanediol.

The types of thermosettable polyester resins, which are especially suitable for injection molding, are well-known to the art. Again, great detail is not necessary in describing these materials herein, as they do not, in themselves, comprise any part of this invention. Examples of the most generally available suitable unsaturated linear polyesters are the polycondensation products of (1) propylene glycol and maleic or fumaric acids, (2) 1,3 butanediol and maleic or fumaric acids, (3) combinations of ethylene and propylene glycols, with maleic or fumaric acids, (4) combinations of propylene glycol and dipropylene glycol with maleic or fumaric acids, and (5) diethylene glycol and maleic or fumaric acids; the above polyesters are all usually modified with a minor proportion of a saturated dibasic acid, the most common being isophthalic acid, terephthalic acid and orthophthalic acid.

The linear, unsaturated polyester is further polymerized during the molding operation, to form the thermoset molded resin product, by copolymerization with a copolymerizable monomeric material, generally of the vinyl type, i.e., having a polymerizably reactive vinyl group, $CH_2=C<$ group, in each molecule. The cross-linking agent is generally selected to be soluble, or miscible, with the linear polyester resin, and the usual examples include styrene, vinyltoluene, diallylphthalate, alpha-methyl styrene and methyl methacrylate. Mixtures of cross-linking agents can be used if desired. It is preferred, generally, to utilize styrene as the most commonly available such cross-linking agent.

The relative proportions of monomeric cross-linking agent and linear polyester present in the resin composition in accordance with the present invention, can vary over a wide range, and are generally based upon the degree of unsaturation in the linear polyester. Generally, the cross-linking agent can be present in an amount, varying from about 0.4 to about 2 weight percent, based on the total weight of the resin composition, including the polyester resin and the cross-linking monomer.

The only requirement, that is generally relevant to the present invention, is that the monomer be copolymerizable with the linear polyester and that it form upon copolymerizing with the polyester a cross-linked or thermoset structure. It is further desirable that the two materials be substantially completely miscible with each other, at least over the range of concentrations in which they will be admixed. Other polymerizable monomers, which are sometimes added in minor proportions along with the more commonly-used monomers referred to above, include other low-alkyl esters of methacrylic acid as well as the lower alkyl esters of acrylic acid, chlorostyrene, 1,3-butanediol dimethacrylate, diallylphthalate. Preferably, the monomeric liquid is present in an amount of from about 30 to about 60 percent by weight of the total resin composition.

In order to obtain a satisfactory cure, in most cases, even when heating the thermosettable resin composition during the molding operation, it is desired that there be a catalyst or other conventional initiator, incorporated into the resin composition. Generally, the initiators or catalysts are free radical-type peroxide initiators, and include, for example, compounds such as methyl ethyl ketone peroxide, benzoyl peroxide, t-butylperoctoate, di-t-butylperoctoate, t-butylperbenzoate, cyclohexanone peroxide, di-t-butylperoxide and the like. Such initiators are generally added into the resin system just before the molding process is carried out. Generally, the activators, or catalysts, are added in amounts of from about 0.1 percent to about 3 percent by weight of the resin composition. Again the type and concentration of the activator, or catalyst, which is utilized is not a part of the present invention, and any of those which are conventionally available on the market can be utilized. The actual curing of the thermosettable resin composition is carried out during the molding process under heat and pressure normally associated with such procedures. Generally, polymerization inhibitors and accelerators are added to the compositions to perform their normal functions, as is well understood in the art.

It has been found, however, with regard to the two aspects of the present invention, that they are most especially effective when utilized for filled resin compositions, that are filled with granular or fibrous particulate material. Most preferably, however, the two aspects of the present invention are utilized in combination with those polyester thermosettable resin compositions which include a granular filler material, that is a filler material in which no one dimension is an order of magnitude, or more, greater than another dimension, for example, as would be the case with fibrous, e.g., glass, filler materials. Examples of such granular filler materials include hydrated alumina; amorphous silica, granular glass particles; carbon black and other particulate granular carbon materials; cellulose flours, such as wood flour and shell flour; other mineral materials, such as calcium carbonate; metallic oxides such as alumina, beryllium oxide, iron oxide, magnesia, titanium oxide, zinc oxide and zirconia; silica materials such as, the silica minerals, including diatomaceous earth, novaculite, quartz, sand and tripoli and the synthetic amorphous silica, including fumed colloidal silica, silica aerogel or wet process silica, and perlite. Silicate minerals have also been used, such as asbestos powder, kaolin, mica, nepheline syenite, talc and wollastonite; as well as synthetic silicate salts, such as aluminum silicate or calcium silicate, and other inorganic compounds of a miscellaneous type, for example, barium ferrite, barium sulfate, molybdenum disulfide or silicon carbide. The fibrous filler materials include asbestos fibers, fibrous glass or fibrous carbon materials, as well as, under certain circumstances, organic cellulose fibrous materials, for example, hemp or sisal fibers.

It has been found, that a most preferred non-fibrous filled polyester contains at least one metallic oxide and at least one synthetic amorphous silica filler. Optimally, the molding composition comprises at least about 110 parts by weight of the particulate material, per each 100 parts of the resin composition. Generally, it is preferred that not more than about 210 parts by weight of the filler material be present per 100 parts of the resin composition. The molding compound preferably contains a mixture of particulate fillers of different particle sizes. Optimally, there is present at least about 95 parts per 100 parts by weight of resin composition of a particulate filler material, such as a hydrated metal oxide, e.g., hydrated alumina, having a particle size of at least about 5 microns and not greater than about 60 microns. There is also present a second finer particle size filler, in amounts of at least about 15 parts per 100 parts, and not more than about 35 parts per 100 parts, having a particle size in the range of from about 0.5 to about 7 microns such as amorphous synthetic silica materials.

The examples which follow illustrate preferred examples of the present invention, but are not intended to be exclusive of the full range thereof. The various conventional materials, which are utilized, can be substituted for by their equivalents, including those materials which are presently available, as well as those materials which may become available in the future.

EXAMPLE 1

A resin composition, 100 grams of a commercially available type, formed of a linear unsaturated polyester formed by condensing propolyene glycol with maleic anhydride and isophthalic acid, and containing styrene as a cross-linking agent in an amount of about 32 percent of the total resin mixture, is admixed with three grams of carbon black in a mixing vat. The resin composition and pigment combination is then admixed with an additive formulation having the following composition

| Ingredients | Parts by weight |
|---|---|
| Dialkyl Dialky phosphate ester | .25 grams |
| Ethylene bis stearamide | .14 grams |
| Dimethyl polysiloxane (750 cs.) | 1 cc |

The alkyl phosphate ester and the waxy ethylene bis stearamide were admixed to a jelly consistency, then admixed with the dimethyl polysiloxane and added to the resin. Hydrated alumina (6.5–9.5 micron particle size), 125 grams, was then added in turn to the resin, followed by 25 grams of amorphous silica (1.5 micron particle size), and finally, a hydroquinone, (antioxidant), and the mixing continued until the resin composition is uniformly mixed. During mixing, care must be taken, as is well known in the art, to avoid speeds which would increase friction, and thus, increase temperature to a point which would result in the loss of the volatile styrene material, or initiate a low level curing reaction. It has been found that the friction obtainable during mixing is decreased by the addition of the polysiloxane - alkyl phosphate ester - alkylene bis alkamide combination, prior to the addition of the filler materials.

The above mixture was then injection molded, in accordance with the procedure and apparatus set forth in U.S. Pat. No. 3,608,150, to form cured and molded polyester resin boxes, having the following dimensions:

5.5 in. × 12 in. × 5 in.

The molded articles readily separated from the mold walls, following completion of cure and cooling, and the surface of the molded article was smooth and was found to be readily susceptible to further desirable finishing. The boxes had good mechanical strength and good dimensional stability, the surfaces of the boxes were not mottled.

The same procedure was repeated, except that the dimethyl polysiloxane was eliminated. The resulting surface was found to be pitted, and the molded resin walls did not have uniform strength, as a result of gas bubbles formed therein.

The procedure of Example 1 was again repeated, but this time omitting the alkylene bis stearamide. The resulting molded product did not readily separate from the mold, resulting in a mottled surface, which did not have a desirably smooth characteristic. Material was found to be adhered to the mold walls after removal of the molded product.

The procedure of Example 1 was again repeated, except that the alkyl phosphate ester was replaced by an equal quantity of ethylene bis stearamide. The molded product was found to be substantially completely unsatisfactory, and adhered very strongly to the walls of the mold.

The procedure of Example 1 was repeated, except that the ethylene bis stearamide was omitted, and the amount of alkyl phosphate ester increased to a total of one gram. The molded product readily separated from the walls of the mold, following molding and curing, but was found to be defective in that the surface appearance was mottled, and it was difficult to apply a surface finish. The product was substantially full of gas bubbles, however.

EXAMPLE 2

The procedure of Example 1 was repeated, except that a dimethly polysiloxane, having a viscosity of 2,000, was substituted for that previously used. Substantially the same results were obtained.

EXAMPLE 3

The procedure of Example 1 was repeated, except that the dimethyl polysiloxane was omitted, and prior to carrying out the actual injection molding, the resin was heated to about 30° C. and subjected to vacuum to remove dissolved and dispersed air bubbles. The formulation had also previously been admixed with 1.3 grams of additional styrene, to compensate for the material that was lost to the atmosphere during the suction treatment.

The molded products were found to have a satisfactory appearance, separated readily from the mold after the molding operation was completed, and had a surface capable of being suitably finished.

The same procedure was repeated, except that the ethylene bis stearamide was omitted, and the amount of alkyl phosphate ester was increased to one gram. The resultant molded product was found to have a mottled surface appearance which was not easily finished.

The results of the aforesaid Examples show that the two aspects of the present invention result alone, or in combination, in an improved product and one in which the process is rendered substantially more economical and efficient. It is understood that the dimethyl polysiloxane degassing agent can be used in a polyester resin formulation with any other internal parting agent, or without any internal parting agent, and still be effective for its primary purpose, and similarly the alkyl phosphate and alkylene bis alkamide can be used without the polysiloxane degassing agent.

The patentable aspects of the present invention, which are claimed, are as follows:

1. In a polymerizable thermosetting liquid resin composition which is designed and adapted for use in an injection molding process, the composition comprising an unsaturated polyester resin capable of cross-linking to form a thermoset polymer and a cross-linking monomer capable of copolymerizing with the polyester resin to form a cross-linked thermoset polymer, and a particulate filler material in an amount of at least about 100 parts per 100 parts by weight of the resin and cross-linking monomer, the improvement comprising a dimethylpolysiloxane, having a viscosity of at least 100 centistokes when measured at 25° C in a Brookfield viscometer, RV series, and converted to centistokes according to the formula $$\text{viscosity(centistokes)} = \text{viscosity(centipoise)}/\text{density};$$

dimethylpolysiloxane being present in an amount of from about 0.02 to about 3 parts per 100 parts of the combined resin, whereby the polymerizable resin composition is rendered substantially free of incondensible gases to that voids are not formed in a product injection molded from said polymerizable resin composition.

2. The polymerizable thermosetting liquid resin composition of claim 1, wherein the cross-linking monomer is styrene.

3. The polymerizable thermosetting liquid resin composition of claim 1, comprising in addition initiators and catalysts suitable for use in injection molding operations.

4. In the resin composition of claim 1, where the dimethyl polysiloxane is a liquid having a viscosity not greater than about 60,000 cs at 25° C.

5. The resin composition of claim 1, wherein the particulate filler material is a granular filler having a particle size in the range of from about 5 to about 60 microns.

6. The resin composition of claim 5, wherein the granular particulate filler contains at least one metal oxide and at least one amorphous silica material.

7. The resin composition of claim 6, wherein the metal oxide particles are present in an amount of from about 90 to about 180 parts by weight per 100 parts of the resin composition and wherein the amorphous silica is present in an amount from about 15 parts by weight to about 35 parts by weight of the resin composition.

8. The resin composition of claim 1, wherein the improvement comprises, in addition, the combination of an alkyl phosphate ester and an alkylene bisalkamide, the quantity of alkyl phosphate ester being not substantially greater than 0.4 parts per 100 parts by weight of resin, the combination being present in an amount sufficient to impart satisfactory mold-release qualities to the resin such that a thermoset molded resin product formed therefrom releases cleanly from an injection mold without the formation of spew on the surface of the final molded product.

9. In a polymerizable thermosetting composition comprising an unsaturated polyester resin capable of cross-linking to form a thermoset polymer and a cross-linking monomer capable of copolymerizing with the polyester resin to form a cross-link thermoset polymer, the improvement comprising the dispersion in the resin composition of the combination of an alkyl phosphate ester and alkylene bisalkamide, the alkyl phosphate ester being present in a quantity not substantially greater than 0.4 parts per 100 parts by weight of resin, the combination providing satisfactory mold-release activity for the resin composition following polymerization and curing in the mold but without any surface spew.

10. The resin composition of claim 9, wherein the alkyl phosphate ester is a dialkyl phosphate ester and wherein the alkyl groups each contain from about 6 to about 32 carbon atoms.

11. The polymerizable resin composition of claim 10, wherein the alkyl groups each contain from about 8 to about 24 carbon atoms.

12. The resin composition of claim 11, wherein the alkylene bis alkamide has an alkylene group containing not more than about 8 carbon atoms and an alkamide group containing not more than about 32 carbon atoms.

13. The resin composition of claim 12, wherein the alkylene group contains not more than about 5 carbon atoms and the alkamide group contains from about 6 to about 24 carbon atoms, the alkylene bis alkamide being a waxy solid.

14. The resin composition of claim 11, wherein the alkyl phosphate ester is present in an amount of from about 0.1 part to about 0.4 part per 100 parts by weight of resin composition and the alkylene bis alkamide is present in an amount of from about 0.09 part to about 0.3 part per 100 parts by weight of the resin composition.

15. In a polymerizable thermosetting composition comprising an unsaturated polyester resin capable of cross-linking to form a thermoset polymer and a cross-linking monomer capable of copolymerizing with the polyester resin to form a cross-linked thermoset polymer, the improvement comprising the dispersion of a dimethyl polysiloxane having a viscosity in the range of from about 600 to about 1,000 cs. at 25° C as measured by in an amount of from about 0.02 part to about 3 parts by weight per 100 parts by weight of the resin composition, ethylene bis stearamide in an amount of from about 0.09 to about 0.3 parts by weight per 100 parts by weight of resin composition and a dialkyl phosphate ester wherein each alkyl group contains from about 8 to about 24 carbon atoms and wherein the alkyl phosphate ester is present in an amount of from about 0.1 to about 0.4 part per 100 parts by weight of resin composition.

16. The polymerizable resin composition of claim 9, comprising in addition, particulate filler material in an amount of at least about 100 parts per 100 parts by weight of the resin composition.

17. In the resin composition of claim 1, where the dimethyl polysiloxane is a liquid having a viscosity not greater than about 5,000 cs. at 25° C.

* * * * *